(12) United States Patent
Nishimura et al.

(10) Patent No.: US 7,726,885 B2
(45) Date of Patent: Jun. 1, 2010

(54) OPTICAL CONNECTOR HAVING A FITTING PROTRUSION OR FITTING RECESS USED FOR POSITIONING

(75) Inventors: Akito Nishimura, Sakura (JP);
Kunihiko Fujiwara, Sakura (JP);
Tatsuya Ohta, Sakura (JP); Kenji Sasaki, Sakura (JP); Yukio Hayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/259,705

(22) Filed: Oct. 28, 2008

(65) Prior Publication Data
US 2009/0116793 A1 May 7, 2009

(30) Foreign Application Priority Data
Oct. 29, 2007 (JP) .............................. 2007-280312
Sep. 11, 2008 (JP) .............................. 2008-234026

(51) Int. Cl.
*G02B 6/36* (2006.01)

(52) U.S. Cl. ............................ 385/78; 385/92; 385/147

(58) Field of Classification Search ............. 385/78–92, 385/15, 20
See application file for complete search history.

(56) References Cited

U.S. PATENT DOCUMENTS 6,290,527 B1 * 9/2001 Takaya et al. ............... 439/352
6,719,927 B2 * 4/2004 Sakurai et al. .............. 264/1.25

FOREIGN PATENT DOCUMENTS

JP            10170764   *  6/1998
JP         2007-33491 A    2/2007

* cited by examiner

*Primary Examiner*—Akm E Ullah
(74) *Attorney, Agent, or Firm*—Sughrue Mion, PLLC

(57) ABSTRACT

An optical connector of a fitting pin positioning type includes multiple optical fiber insertion holes arranged in one row and fitting holes or fitting pins. The fitting holes or the fitting pins for positioning are respectively disposed on mutually opposite sides of a straight line connecting centers of the optical fiber insertion holes and are located point-symmetrically with respect to a center of the row of the entire optical fiber insertion holes arranged on the straight line.

10 Claims, 6 Drawing Sheets

OPTICAL CONNECTOR HAVING A FITTING PROTRUSION OR FITTING RECESS USED FOR POSITIONING

CROSS REFERENCE TO RELATED APPLICATION

This application claims the benefit of priority under 35 U.S.C. §119 to Japanese Patent Application Nos. 2007-280312 filed on Oct. 29, 2007 and 2008-234026 filed on Sep. 11, 2008, the entire contents of which are incorporated by reference herein.

BACKGROUND OF THE INVENTION

1. Field of the Invention

The present invention relates to an optical connector having a fitting protrusion or a fitting recess used for positioning.

2. Description of the Related Art

Japanese Patent Application Laid-Open Publication No. 2007-033491 discloses a conventional optical connector 1 which is positioned by use of fitting pins. This optical connector 1 is shown in FIG. 1.

The optical connector 1 is formed by resin molding. On a front surface 1a of the optical connector 1, multiple optical fiber insertion holes 2 are arranged in one row, and fitting holes 3 are disposed on both sides of the row of the optical fiber insertion holes 2.

The two fitting holes 3 are located on a straight line L connecting the centers of the optical fiber insertion holes 2 or in positions slightly displaced to one side (to an upper side or a lower side only) from the straight line L connecting the centers of the optical fiber insertion holes 2. Optical fibers 5a of an optical fiber ribbon 5 are respectively inserted and fixed to the optical fiber insertion holes 2. Reference numeral 6 denotes a rubber boot. Here, the optical connector 1 is substantially equivalent to a F12-type multi-core mechanically transferable (MT) connector as defined in JIS C 5981.

SUMMARY OF THE INVENTION

The optical connector 1 of this conventional type includes the optical fiber insertion holes and the fitting holes located on both sides of the row of the optical fiber insertion holes. Due to the layout of these holes, the optical connector has a long flat shape whose longer side extends parallel to the arrangement direction of the optical fibers. Accordingly, this aspect causes the following problems.

(1) Shrinkage deformation (warpage) occurs when resin shrinks upon curing in the course of resin molding, Positional accuracy of the optical fiber insertion holes tends to be degraded by this shrinkage deformation (warpage).

(2) The lateral width of a standard MT optical connector is fixed. Accordingly, the number of the optical fiber insertion holes cannot be increased if the fitting holes with large diameters are provided on the right and left sides.

There is also a two-dimensional array optical connector provided with two or more vertically-spaced rows of optical fiber insertion holes in order to increase the number of the optical fiber insertion holes. However, this optical connector is more difficult to accurately form and more expensive to manufacture than the one-dimensional array optical connector having the single row of the optical fiber insertion holes.

(3) The standard MT optical connector is formed into a long flat shape with a large lateral width. Therefore, if multiple optical connectors are arranged side by side on a mount board such as a photoelectric composite wiring board, the lateral width of the entire optical connectors becomes too wide. Accordingly, the design freedom of the board is lost and it is hard to achieve high-density mounting of the optical connectors.

An object of the present invention is to provide an optical connector easy to increase in cores, inexpensive to manufacture, providing good positional accuracy of optical fiber insertion holes, and having less restrictions on the number or positions of optical connectors on a mount board for optical connectors to allow high-density mounting thereon.

A first aspect of the present invention provides an optical connector which includes a ferrule body having a connection end surface, at least one row of optical fiber insertion holes provided on the connection end surface, and positioning protrusions or positioning recesses provided on the connection end surface. Here, the row of the optical fiber insertion holes extends parallel to a straight line passing through a center of the connection end surface, and the positioning protrusions or the positioning recesses are located on mutually opposite sides of the straight line, and the positioning protrusions or the positioning recesses are located point-symmetrically with respect to the center on the straight line.

A second aspect of the present invention provides an optical connector which includes a ferrule body having a connection end surface, positioning protrusions or positioning recesses provided on the connection end surface, and a reflector configured to modify a direction of light propagating through at least one row of fixed optical fibers so as to cause the light to pass through the connector end surface. Here, the positioning protrusions or the positioning recesses are respectively located on mutually opposite sides of a straight line which is parallel to a row of optical paths of the light on the connection end surface and which passes through a center thereof, and the positioning protrusions or the positioning recesses are located point-symmetrically with respect to the center.

The ferrule body preferably has an inclined surface serving as the reflector and the inclined surface is preferably inclined relative to optical axes of the optical fibers.

The ferrule body may include a recess on the connection end surface. The inclined surface is preferably included in surfaces defining the recess.

The inclined surface may be provided as an outer side surface of the ferrule body. The light is preferably reflected inside the ferrule body by the inclined surface.

The positioning protrusions or the positioning recesses may be located on a straight line perpendicular to the straight line.

The positioning protrusions are preferably pins of a round bar shape and the positioning recesses are preferably holes into which the pins are to be fitted.

The pins may be formed of resin integrally with the ferrule body.

DETAILED DESCRIPTION OF THE PREFERRED EMBODIMENTS

Figure 1:
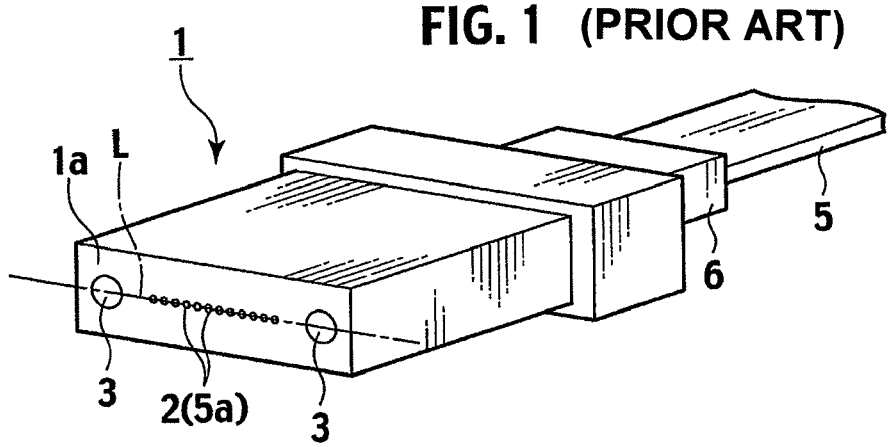
FIG. 1 is a perspective view of a conventional optical connector.

Now, optical connectors according to embodiments of the present invention will be described below with reference to the accompanying drawings.

In the respective embodiments below, positioning protrusions will be described as fitting pins while positioning recesses will be described as fitting holes. The positioning protrusions and the positioning recesses are general terms of structures having a function to position two components. Therefore, these constituents are not limited only to the description in the respective embodiments and in the drawings.

First Embodiment

Figure 2:
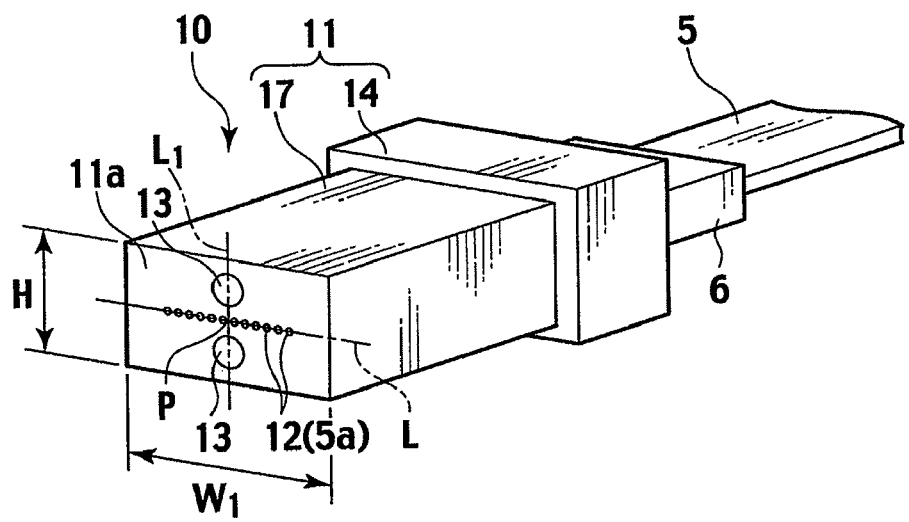
FIG. 2 is a perspective view showing an example of an optical connector according to a first embodiment of the present invention.

A first embodiment of the present invention will be described with reference to FIG. 2. An optical connector 10 of this embodiment is a multi-core optical connector of a fitting pin positioning type which is integrally formed of resin. As shown in FIG. 2, multiple optical fiber insertion holes 12 arranged in a lateral line are opened on a connection end surface 11a of a ferrule body 11 which serves as a connection surface with an opponent optical connector (not shown). Two fitting holes 13 for positioning are formed above and below these optical fiber insertion holes 12 so as to sandwich the row of the optical fiber insertion holes 12 therebetween. A diameter of each fitting hole 13 is larger than those of the optical fiber insertion holes 12. A straight line L is a straight line that horizontally passes through the center of the connection end surface 11a. The center of each of the optical fiber insertion holes 12 is located on the straight line L. The two fitting holes 13 are formed above and below the straight line L, respectively. The center P of the straight line L is the center of the row of the optical fiber insertion holes 12, and is also the center in the lateral direction of the connection end surface 11a. The two fitting holes 13 are disposed point-symmetrically with respect to the center P. A straight line $L_1$ that connects aperture centers of the two fitting holes is perpendicular to the straight line L.

A flange 14 is formed on a rear end portion of the ferrule body 11 located on the opposite side to the connection end surface 11a. The flange 14 has a longitudinal width and a lateral width which are slightly longer than those of a front portion 17 of the ferrule body 11. An open end (not shown) is formed in a portion, closer to the flange, of the front portion 17. The ferrule body 11 includes a hollow portion (not shown) which is formed from this open end inward and which serves as an adhesive fitting space. A window (not shown) for filling an adhesive and for connecting the hollow portion and outside may be opened on any of an upper surface or a lower surface of the ferrule body 11.

A portion located closer to the connection end surface 11a than the hollow portion is formed by filling resin. The multiple optical fiber insertion holes 12 penetrate this portion along a connecting direction of the optical connector (which is equivalent to a longitudinal direction of the optical connector or the direction of insertion of the optical fibers).

When fitting optical fibers 5a to the ferrule body 11, a coating at a front end of an optical fiber ribbon 5 is removed to expose the optical fibers 5a. Then, the optical fibers 5a are inserted from the open end closer to the flange 14 into the optical fiber insertion holes 12.

The optical fibers 5a are bonded to the ferrule body 11 by filling an adhesive into the hollow portion after the optical fibers 5a are inserted into the respective optical fiber insertion holes 12.

In order to guide the front ends of the optical fibers 5a appropriately to the optical fiber insertion holes 12, it is possible to apply a guide structure employed in general mechanically transferable (MT) connectors.

Alternatively, it is also possible to provide a boot 6 made of rubber at a rear part of the ferrule body 11 for protecting a base of the optical fiber ribbon 5.

Unlike the MT connector in the typical horizontally long shape shown in FIG. 1, the ferrule body 11 of this embodiment includes the two fitting holes 13 that are arranged above and below the row of the optical fiber insertion holes 12 so as to sandwich the row. When the lateral width of the optical connector is defined and unable to increase further, it is still possible to increase the lateral width of the row of the optical fiber insertion holes by arranging of the fitting holes vertically. Therefore, it is possible to increase the number of the optical fiber insertion holes 12 and thereby to increase the number of the optical fibers 5a to be housed in the ferrule body 11. For example, a MT connector in a standard shape is defined to have a lateral width of 6.4 mm and a thickness of 2.5 mm. Meanwhile, a downsized optical connector called mini-MT is defined to have a lateral width of 4.4 mm and a thickness of 2.5 mm. Moreover, as shown in FIG. 1, the large-diameter fitting holes 3 are provided on both sides of the row of optical fibers 5a in these conventional connectors so that it is not possible to increase the number of the optical fiber insertion holes 5a anymore. However, in this embodiment, it is possible to increase the number of the optical fibers 5a to be housed in the ferrule body 11 by changing the locations of the fitting holes. Moreover, since the optical fiber insertion holes 12 are arranged in one row, it is possible to provide the multi-core optical connector with high molding accuracy at low costs.

As a result of increasing the number of the optical fibers 5a to be housed in the optical connector, the shape of the optical connector may be deviated from the standard shape. Even in such a case, it is possible to avoid a significant change in the proportion between a lateral dimension (a width dimension) $W_1$ and a longitudinal dimension (a height dimension) H of the optical connector shown in FIG. 2 by arranging the fitting holes vertically so as to sandwich the row of the optical fibers 5a. Specifically, if the ferrule body 11 is extended only in the lateral direction, the ferrule body 11 becomes weak against strain in the lateral direction (such as warpage). However, in the case of the shape shown in this embodiment, it is unnecessary to consider such strain. In other words, it is possible to reduce the difference between the longitudinal dimension H and the lateral dimension $W_1$ of the ferrule body 11. Accordingly, it is possible to reduce occurrence of molding strain attributable to uneven curing shrinkage at the time of resin molding or the like, and thereby to prevent degradation in positional accuracy of the optical fiber insertion holes 12.

Moreover, when increasing the number of the optical fibers to be housed therein, the connection end surface ha of the ferrule body 11 is not always extended excessively in the lateral direction. For example, the lateral dimension $W_1$ of the optical connector of the present invention is smaller than that of the MT connector having the conventional pin layout. Therefore, the design freedom of a circuit board to mount the optical connector is improved and high-density mounting of the optical connectors can be achieved. For example, when a case of mounting the optical connectors of the present invention laterally on a photoelectric circuit board is compared with a case of mounting the MT connectors each having the same number of cores laterally thereon, the total lateral width of the optical connectors of the present invention which are laterally arranged becomes smaller than the case of laterally arranging the same number of the MT connectors.

Here, when the fitting holes 13 are opened above and below the row of the optical fiber insertion holes, the height dimension (the width) H of the optical connector 1 becomes greater than that of the typical MT connector having the same number of cores. However, the MT connector in the standard shape originally has a long width between upper and lower side surfaces. Accordingly, even when the fitting holes 13 are formed in these positions, the increase in the width required for forming the fitting holes is not so large.

Therefore, the space per optical fiber in the ferrule body 11 (i.e. a value obtained by dividing the area of the connection end surface 11a by the number of the optical fibers 5a housed therein) becomes smaller than a corresponding value of the typical MT connector. Hence, it is possible to downsize the optical connector.

Moreover, since the center of the straight line connecting the two fitting holes 13 coincides with the center of the row of arrangement of the fiber holes, it is possible to reduce occurrence of molding strain attributable to uneven curing shrinkage and the like at the time of resin molding. Therefore, it is possible to reduce variations in the positions of the holes due to temperature change.

Now, second to fifth embodiments will be described. In the drawings for showing these embodiments, constituents that are common to those in the first embodiment will be designated with the same reference numerals and explanations thereof will be omitted.

Second Embodiment

Figure 3:
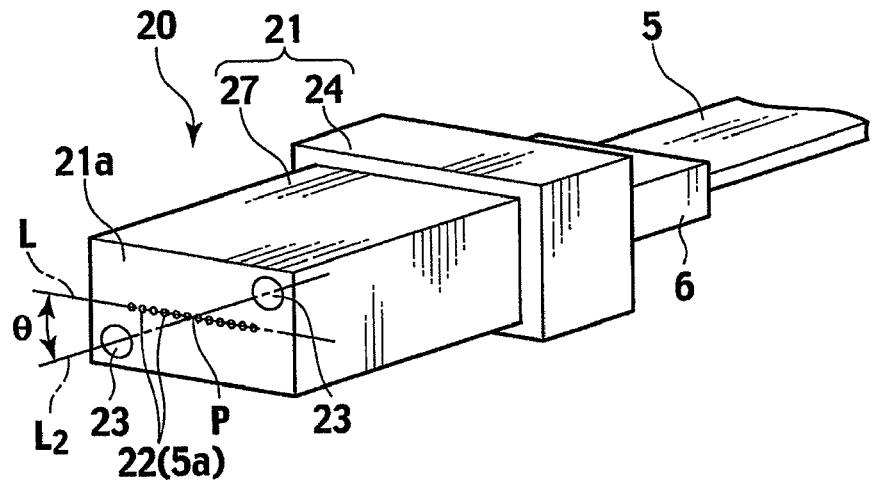
FIG. 3 is a perspective view showing an example of an optical connector according to a second embodiment of the present invention.

A second embodiment of the present invention will be described with reference to FIG. 3. In FIG. 3, constituents that are common to those in FIG. 2 will be designated by the same reference numerals.

As shown in FIG. 3, an optical connector 20 according to the second embodiment is an optical connector similar to the first embodiment. Multiple optical fiber insertion holes 22 arranged in one lateral row and two fitting holes 23 having a larger diameter than that of the optical fiber insertion holes 22 are formed on a connection end surface 21a of a ferrule body 21. The two fitting holes 23 for positioning are formed on mutually vertically opposite sides relative to a straight line L and near corners of the connection end surface 21a. These two fitting holes 23 are formed in positions that are point-symmetrical with respect to a center P of the row. Moreover, the centers of the two fitting holes 23 are located on a straight line $L_2$ that defines a predetermined angle θ other than 90° relative to a straight line L. That is, the embodiment in FIG. 2 is the case where the angle of the straight line $L_1$ relative to the straight line L is set equal to 90°. Therefore, a flange 24 and front portion 27 of the ferrule body 21 correspond to the flange 14 and the front portion 17 of the first embodiment, respectively. A hollow portion (not shown) similar to the first embodiment is formed inside the ferrule body 21. In this embodiment as well, a window (not shown) for filling an adhesive and for connecting the hollow portion and the outside may be opened on any of an upper surface or a lower surface of the ferrule body 21.

While the optical connector of the second embodiment has similar effects to the first embodiment (FIG. 2), this embodiment further has an advantage that it is possible to modify a positional relation between the fitting holes and the row of the optical fiber insertion holes.

Moreover, by locating the fitting holes in the vicinities of the respective corners of the connection end surface to relatively separate the fitting holes from the row of the optical fiber insertion holes, it is possible to improve molding accuracy of the shape or the arrangement pitch of the optical fiber insertion holes having much smaller diameters than the diameters of the fitting pins.

Third Embodiment

Figure 4:
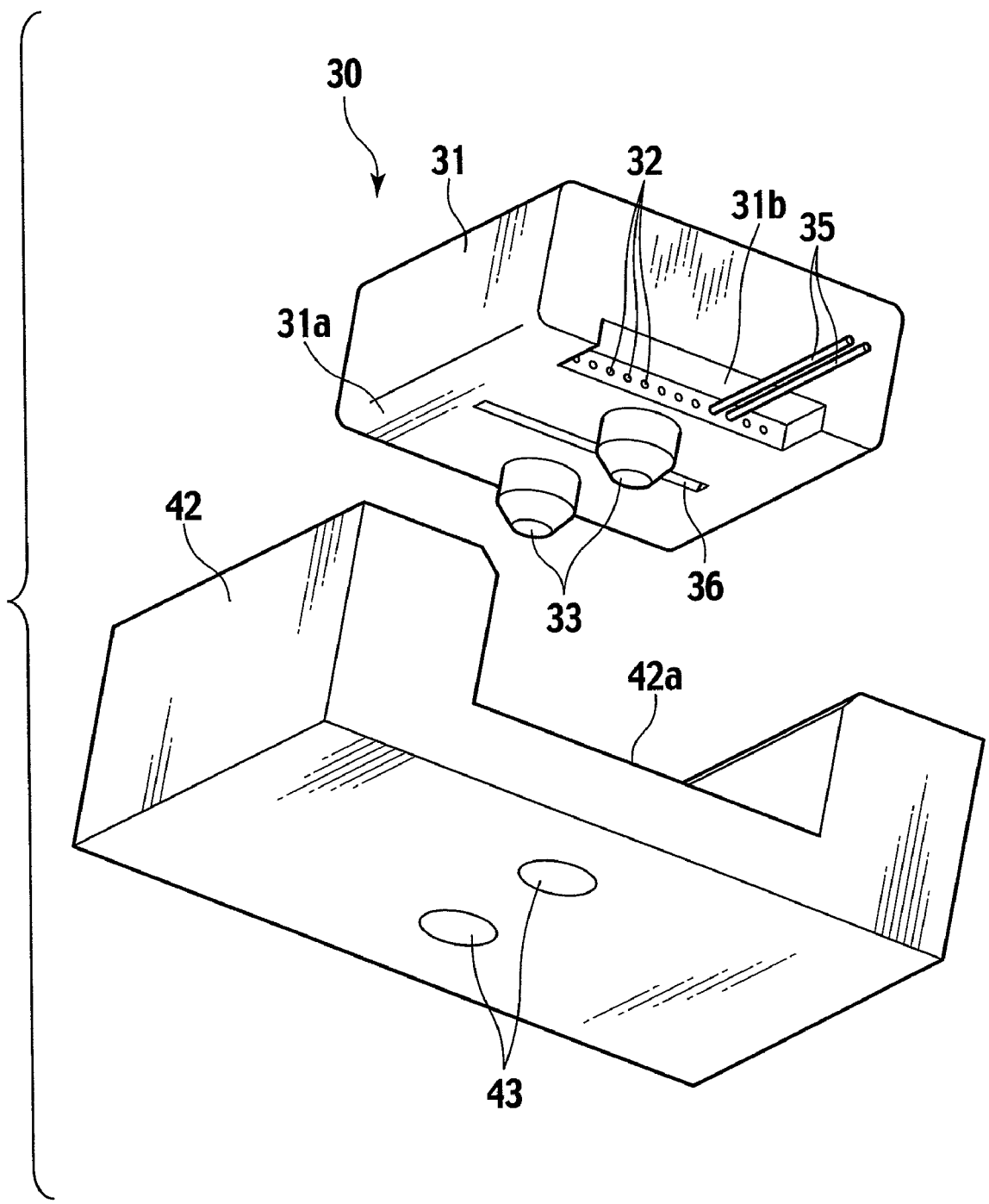
FIG. 4 is a perspective view showing an example of an optical connector and a positioning table for mounting the optical connector according to a third embodiment of the present invention.

A third embodiment of the present invention will be described with reference to FIG. 4 to FIG. 7. An optical connector 30 according to the third embodiment is an optical connector of an optical path change type. An optical connector 30 according to the third embodiment includes a reflector provided on a ferrule body 31. In FIG. 4, a recess 36 functioning as the reflector is formed as an example. The reflector couples optical axes of light propagated through multiple optical fibers 35 fitted to the ferrule body 31 and arranged side by side in one row (in the vertical direction of FIG. 5) at constant intervals, with optical axes of multiple optical elements 41 provided laterally in one row (in the vertical direction of FIG. 5) with constant intervals on a fitting surface 42a of a positioning table 42 on which the ferrule body 31 is mounted. Specifically, the reflector reflects the light so as to guide the light from the optical elements 41 to the optical fibers 35 or to guide the light from the optical fibers 35 to the optical elements 41. Details of the reflector will be described later.

The ferrule body 31 has a substantially rectangular bar shape. The ferrule body 31 is mounted on the fitting surface 42a of the positioning table 42.

A connection surface (also called a bottom surface) 31a of the ferrule body 31 is provided with two fitting pins 33 that protrude perpendicularly. The fitting pins 33 precisely determine the positions of the optical fibers 35 and of the optical elements 41 provided on the positioning table 42 by being fitted into fitting holes 43 that are formed on the positioning table 42. That is, the fitting pins 33 are positioning protrusions in this embodiment. Here, the optical elements include elements (light-receiving elements) configured to output electric signals by receiving light such as a photodiode (PD) array or a vertical recess surface emitting laser (VCSEL), elements (light emitting elements) configured to emit light based on inputted electric signals, and elements (light receiving and emitting elements) formed into modules by combining these elements.

The positioning table 42 includes the fitting surface 42a for the ferrule body 31. The optical elements 41 are provided on the fitting surface 42a. The optical axes of these optical elements 41 are substantially perpendicular to the fitting surface 42. Moreover, the fitting holes 43 are formed in two positions so as to sandwich the optical elements 41 therebetween. An arrangement pitch (an interval) of the two fitting holes 43 is the same as an arrangement pitch of the two fitting pins 33 on the ferrule body 31.

The fitting pins 33 on the ferrule body 31 are fitted into these fitting holes 43. That is, the fitting holes 43 are fitting recesses in this embodiment. The ferrule body 31 is positioned and fixed to the positioning table 42 by inserting and fitting the two fitting pins 33 into the two fitting holes 43.

The positioning table 42 is disposed on a surface of a circuit board or the like and is electrically connected to a circuit pattern formed on the circuit board or the like. In this embodiment, the positioning table 42 is a frame having a U-shaped cross section. Nevertheless, the shape of the positioning table 42 is not limited to this embodiment and various modifications are applicable.

When the positioning between the ferrule body 31 and the positioning table 42 is completed, the optical axes of the multiple optical elements 41 disposed on the surface of the fitting surface 42a are aligned with the optical axes of the multiple optical fibers fitted to the ferrule body 31.

This embodiment will be described further in detail based on FIG. 5. A notch 31b is formed on a lower end of the ferrule body 31 and the recess 36 serving as the above-described reflector is formed on the connection surface 31a of the ferrule body 31. The multiple optical fiber insertion holes 32 are formed in an arrangement with predetermined intervals and so as to penetrate between the notch 31b and the recess 36 (i.e. in the horizontal direction of FIG. 5). An end of each of the optical fiber insertion holes 32 is opened toward the notch 31b on the lower end of the ferrule body 31 while the other end thereof is opened toward the recess 36. Meanwhile, the optical fiber insertion holes 32 are formed parallel to the connection surface 31a (the fitting surface 42a). The optical fibers 35 with resin coatings on ends removed are inserted from the notch 31b into the optical fiber insertion holes 32.

Figure 5:
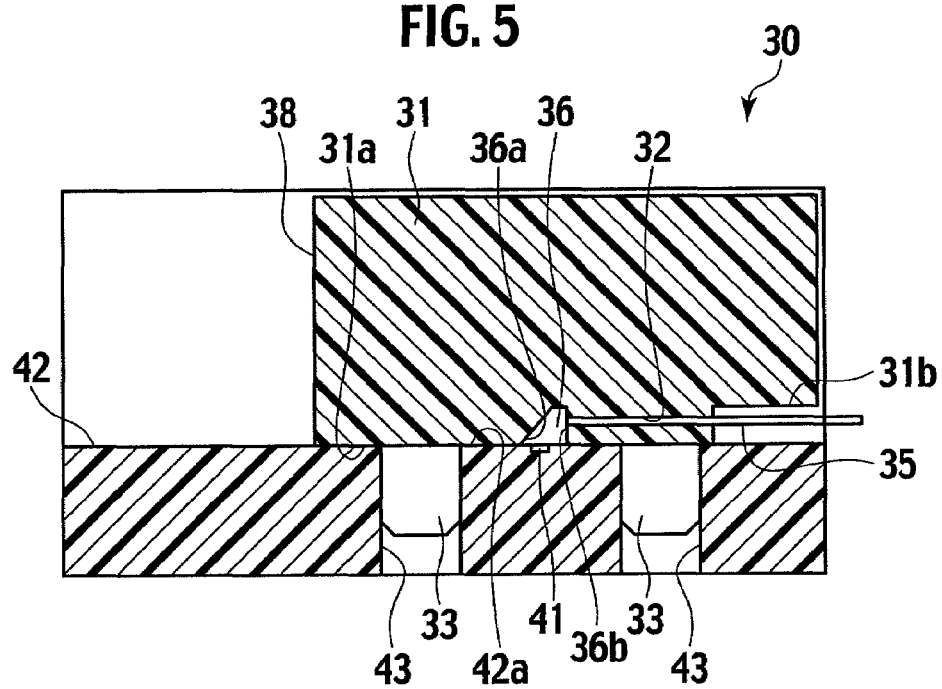
FIG. 5 is a cross-sectional view showing a state of mounting the optical connector in FIG. 4 on the positioning table.

A cross section of the recess 36 is substantially a triangle when viewed from the vertical direction of FIG. 5. The recess 36 includes a perpendicular surface 36b which is rendered perpendicular to the connection surface 31a, and an inclined surface 36a which is inclined relative to the connection surface 31a. The inclined surface 36a is the inclined surface opposed to end surfaces of the optical fibers 35 and is inclined by 45° relative to the connection surface 31a (relative to the vertical direction of FIG. 5). A mirror surface configured to reflect the light from the optical fibers 35 or from the optical elements 41 is formed on the inclined surface 36a by means of metal plating or deposition using silver or the like. Positions of the front end surfaces of the optical fibers 35 which are inserted toward the recess 36 may be aligned with the perpendicular surface 36b. Alternatively, the front end surfaces may protrude slightly into the recess 36.

When the optical axes of the optical elements 41 are perpendicular to the fitting surface 42a, the light emitted either from the optical elements 41 or the optical fibers 35 changes the orientation perpendicularly as a result of reflection by the mirror surface and becomes incident on the optical fibers 35 or the optical elements 41. That is, the optical elements 41 are optically coupled with the optical fibers 35 by way of this light reflection. In other words, when the ferrule body 31 is positioned and fixed to the positioning table 42, the optical axes of the optical elements 41 and the optical axis of the light propagated through the optical fibers 35 form a right angle by way of the mirror surface.

Here, as alternative means for fixing the optical fibers 35 to the ferrule body 31, it is also possible to form multiple v grooves (not shown) having V-shaped cross sections in a longitudinal direction on the bottom surface of the ferrule body 31 and to push the optical fibers 35 into the V grooves by using a lid (not shown) made of transparent glass or the like. In this configuration, it is possible to incorporate a structure disclosed in US Patent Application Publication US 2006/0280410. According to this configuration, it is unnecessary to form minute holes. As a consequence, a structure of a mold for the ferrule body 31 and formation of the ferrule body 31 become simpler. Moreover, a process of inserting the optical fibers 35 into the holes becomes unnecessary. Furthermore, a front end of the lid such as transparent glass may be extended from a region where the V grooves are present to an aperture region of the recess 36. In this case, the aperture region is sealed with transparent glass and the inside of the recess 36 occluded by the glass lid is sealed with an optical adhesive that does not cause a light loss.

Figure 6:
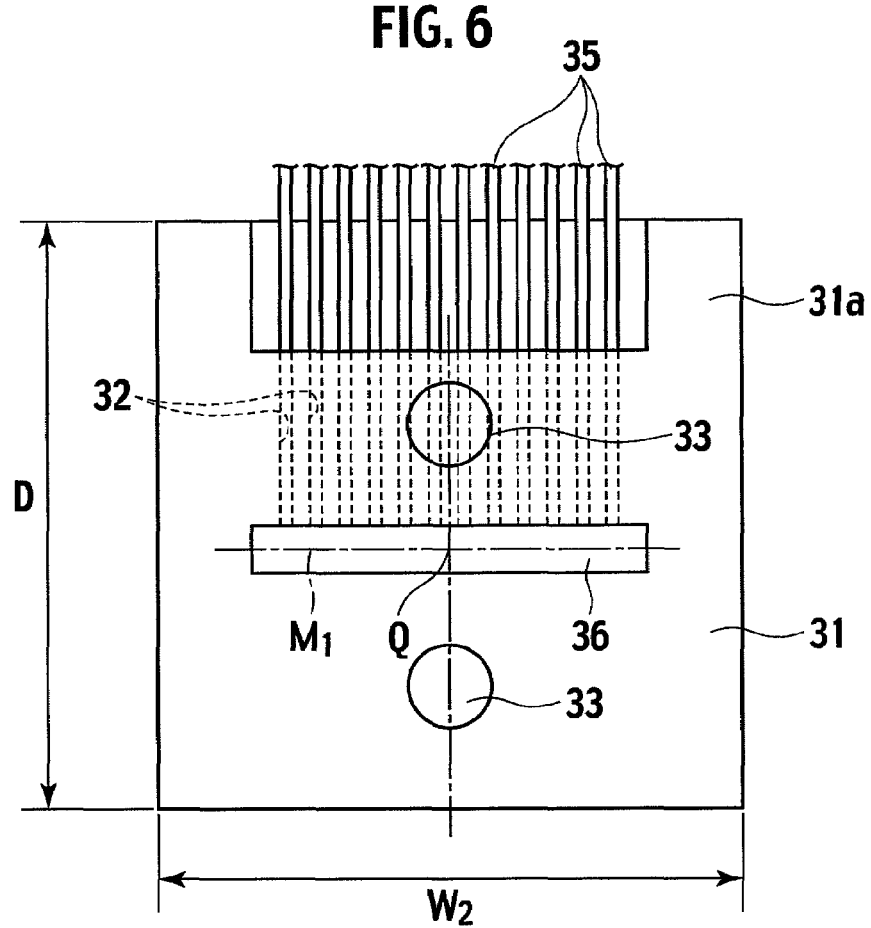
FIG. 6 is a bottom view of the optical connector in FIG. 4.

FIG. 6 shows the connection surface (the bottom surface) 31a of the ferrule body 31. The recess 36 is opened on the connection surface 31a in the horizontal direction of FIG. 6. The optical paths from the respective optical fibers 35 are arranged inside the recess 36 in one row in the horizontal direction of FIG. 6. This row is called an optical path row. On the connection surface 31a, cross sections of the respective optical paths appear in a row of spots. A straight line $M_1$ is a straight line connecting the centers of the cross-sections (the spots) of the optical paths on the connection surface 31a. The center of the row of spots on the straight line $M_1$ is defined as Q.

The two fitting pins 33 are located on mutually opposite sides while sandwiching the straight line $M_1$ and in positions that are point-symmetrical with respect to a center Q of the row of the spots.

Meanwhile, the multiple optical elements (the light receiving and emitting elements) 41 are arranged in one row on the surface of the positioning table 42 opposed to the ferrule body 31 (i.e. the fitting surface 42a) at the same pitch as the row of the optical fibers 35 on the ferrule body 31. Assuming that a straight line $M_2$ (not shown) is a straight line that connects centers of the respective optical elements 41, the two fitting holes 43 on the positioning table 42 are located on mutually opposite sides while sandwiching the straight line $M_2$ and in positions that are point-symmetrical with respect to a center Q of the row of the optical elements 41.

Therefore, when the two fitting pins 33 on the ferrule body 31 are fitted into the two fitting holes 43 on the positioning table 42, the straight line $M_1$ on the connection surface 31a of the ferrule body 31 coincides with the straight line $M_2$ on the positioning table 42.

When the optical axes of the optical elements 41 on the positioning table 42 are aligned with the optical axes of the light propagated through the optical fibers 35 on the ferrule body 31, the optical fibers 35 on the ferrule body 31 are precisely optically connected to the respective optical elements 41 on the positioning table 42.

As similar to the first and second embodiments, in the ferrule body 31 according to the third embodiment, the two fitting pins 33 are not located on both sides of the optical path row. In other words, the centers of the fitting pins 33 are not located on the straight line $M_1$. Accordingly, it is possible to reduce a lateral dimension (a width dimension) $W_2$ of the optical connector. Alternatively, even when the number of the optical fibers 35 is increased, it is possible to eliminate or minimize the increase in the lateral dimension $W_2$.

Meanwhile, since the fitting pins 33 are located on the mutually opposite sides while sandwiching the straight line $M_1$, a connector longitudinal dimension (a depth dimension) D is increased. Accordingly, as compared to the structure having the fitting pins on both sides of the optical path row, it is possible to reduce a difference between the longitudinal and lateral dimensions.

Since the difference between the longitudinal dimension and the lateral dimension is not very large, the lateral dimension (the width dimension) becomes smaller than the horizontally long optical connector provided with the fitting pins on both sides on the optical path row. When disposing multiple optical connectors laterally on a substrate, for example, it is possible to narrow the total lateral width of the optical connectors on the substrate and thereby to improve the design freedom of the substrate.

That is to say, as described previously, the ferrule body 31 includes the row of the optical fiber insertion holes 32 parallel to the connection surface 31a and the predetermined connector longitudinal dimension D is required in the first place in terms of the longitudinal direction of the optical fiber insertion holes. Therefore, the increase in the connector longitudinal dimension attributable to provision of the fitting pins 33 is either none or very limited.

Accordingly, as compared to the case of disposing the fitting pins on the left and right of the optical path row, it is possible to downsize the optical connector and to achieve high-density mounting. As a consequence, the design freedom for wiring will be significantly improved.

Moreover, the reduction in the aspect ratio causes less strain attributable to uneven shrinkage and the like that occurs at the time of curing shrinkage of molded resin, and it is therefore possible to prevent degradation in molding accuracy of the respective constituents such as the optical fiber insertion holes 32.

In this embodiment, the fitting pins 33 are formed on the ferrule body 31 while the fitting holes 43 are formed on the positioning table 42. On the contrary, it is also possible to form the fitting pins on the positioning table 42 and to form the fitting holes on the ferrule body 31.

However, when forming the fitting holes 33 on the ferrule body 31, it is necessary to control the depth of the fitting holes so as not to contact the optical fiber insertion holes 32 or to prevent the optical fiber insertion holes 32 from overlapping the fitting holes 33 in a plan view (not shown). According to this structure, it is possible to provide the fitting holes on the ferrule body 31.

Figure 7:
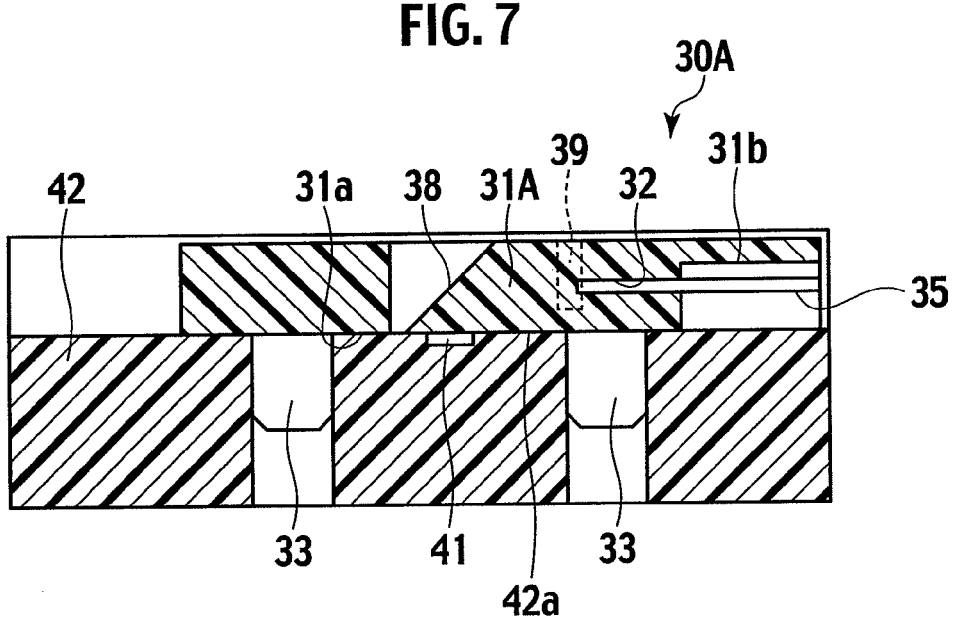
FIG. 7 is a cross-sectional view showing another example of the optical connector and the positioning table for mounting the optical connector according to the third embodiment of the present invention and showing a state of mounting the optical connector on the positioning table.

Meanwhile, it is also possible to form the optical connector of this embodiment without providing the recess 36 in the way of the optical path. FIG. 7 shows a cross-sectional view of an optical connector 30A with this configuration.

When the recess 36 is not provided, a ferrule body 31A is molded of translucent resin (such as epoxy resin or PMMA (polymethyl methacrylate)) so as to allow the light from the optical fibers 35 to pass through the ferrule body 31A.

Optical fiber insertion holes 32 are formed halfway from a rear end of the ferrule body 31A, and a side surface (an outer side surface) 38a of the ferrule body 31A located on an extension line of the optical fiber insertion holes 32 is formed into an inclined surface which is inclined by 45° relative to optical axes of the optical fibers. The inclined surface therefore serves as a reflector. For example, a left side surface 38 of the ferrule body 31A in FIG. 5 is inclined. The inclined surface 38a forms a boundary between air and the resin and therefore serves as a total internal reflection surface. The light emitted from the optical fibers 35 is incident from bottoms of the optical fiber insertion holes 32 onto the ferrule body 31A and is totally reflected by this inclined surface 38a.

The totally reflected light passes through the ferrule body 31A, is emitted from a fitting surface 31a of the ferrule body 31A, and is further incident on the optical elements 41. The light emitted from the optical elements 41 is also propagated through the same optical path and is incident on the optical fibers 35.

Here, it is also possible to form a groove 39 on the ferrule body 31A as indicated with a dotted line so as to allow the optical fiber insertion holes 32 to penetrate from the notch 31b to the groove 39. In this case, it is easier to insert the optical fibers 35 into the optical fiber insertion holes 32.

Fourth Embodiment

Figure 8:
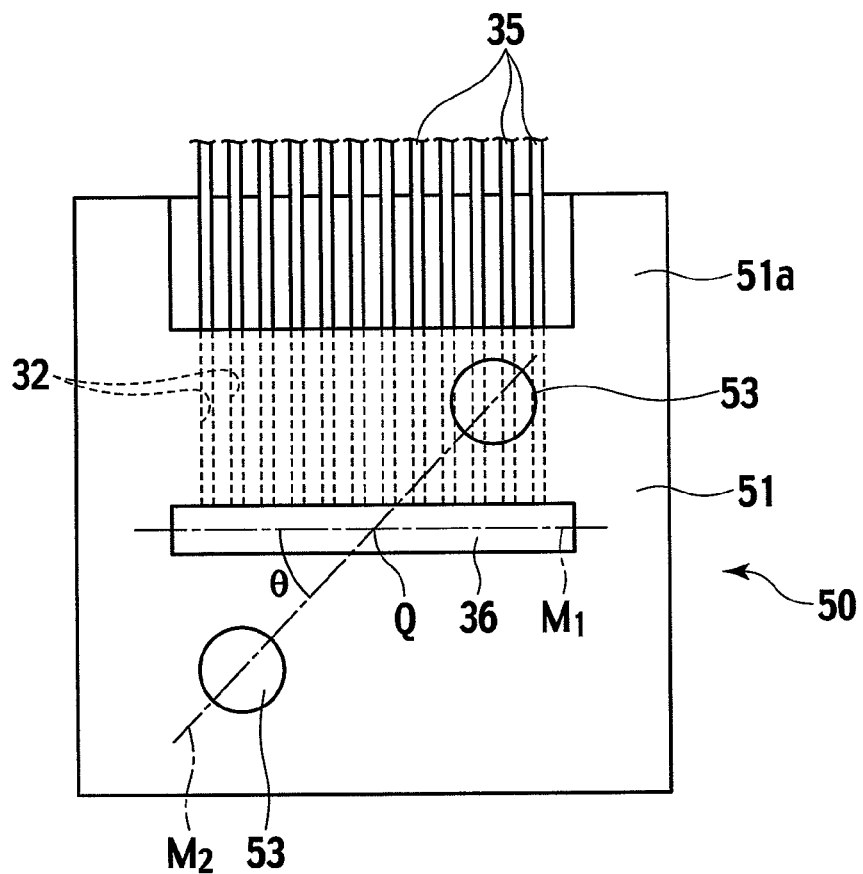
FIG. 8 is a bottom view showing an example of an optical connector according to a fourth embodiment of the present invention.

A fourth embodiment of the present invention will now be described. FIG. 8 shows an optical connector 50 according to the fourth embodiment of the present invention. In FIG. 8, constituents common to those in FIGS. 4 to 6 will be designated by the same reference numerals. When the optical connector 50 is compared with the optical connector 30 of the third embodiment, locations of the fitting pins on the ferrule bodies are different.

In the optical connector 50, two fitting pins 53 provided on a connection surface 51a of a ferrule body 51 are located point-symmetrically with respect to a center Q of an optical path row. Moreover, the centers of the two fitting pins 53 are located on a straight line $M_2$ that defines a certain angle θ relative to a straight line $M_1$ that indicates the position of the optical path row. Further, the angle θ can be set to any value as appropriate.

Fitting holes are provided either on a positioning table (not shown) or a substrate (not shown) to mount the ferrule body 51 in positions corresponding to the two fitting pins 53.

The ferrule body 51 can achieve similar effects to the ferrule body 31 of the third embodiment.

In this embodiment, it is also possible to provide the fitting holes as positioning portions instead of the fitting pins 53. In this case, it is possible to avoid presence of the fitting holes on the row of optical fiber insertion holes 32 by increasing a distance between the fitting holes.

When the ferrule body 51 has a small thickness (the thickness in the vertical direction of FIG. 8), it is not possible to ensure sufficient depth of the fitting holes because the fitting holes may reach the bottoms of the optical fiber insertion holes. However, it is possible to relax such restriction on the depth of the fitting holes by forming the fitting holes so as not to overlap with the existence regions of the optical fiber insertion holes when viewed from the connection surface 51a.

Fifth Embodiment

A fifth embodiment of the present invention will now be described.

Figure 9:
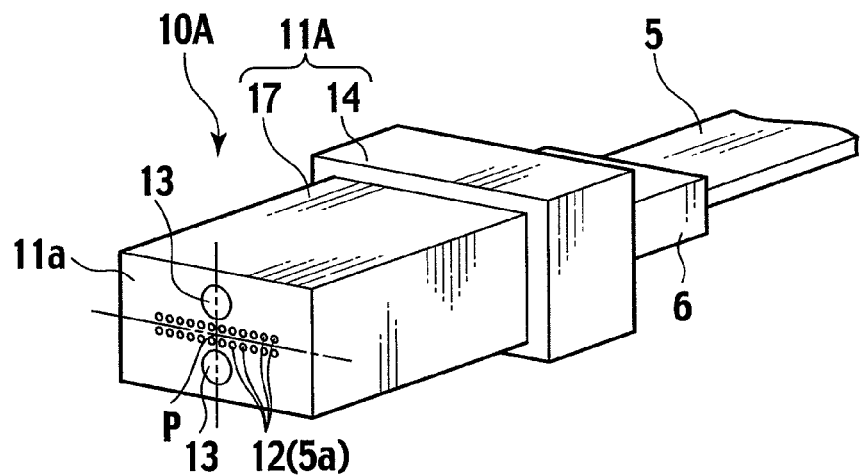
FIG. 9 is a perspective view showing an example of an optical connector according to a fifth embodiment of the present invention.

FIG. 9 shows an optical connector 10A according to a fifth embodiment of the present invention. In FIG. 9, constituents common to those in FIG. 2 are designated by the same reference numerals. A ferrule body 11A of the optical connector 10A includes multiple optical fiber insertion holes 12 of two-dimensional arrangement, which are arranged on two lines on a connection end surface 11a.

The optical connector 10A according to the fifth embodiment represents an embodiment of providing two rows of the optical fiber insertion holes 12 on the connection end surface 11a of the optical connector 10 (see FIG. 2) of the first embodiment. End surfaces of optical fibers 5a are exposed on the optical fiber insertion holes 12.

The optical connector 10A is positioned by causing fitting pins protruding from a connection end surface of an opponent optical connector (not shown) to be fitted into fitting holes 13 formed on a-connection end surface 11a. The optical fiber insertion holes on both of the optical connectors are positioned by this fitting operation. Accordingly, although the filling holes 13 are indicated in FIG. 9, it is also possible to provide fitting pins in the same positions and to provide the fitting holes on the opponent connector instead.

The two fitting holes (or the fitting pins) 13 for positioning are provided on mutually opposite sides relative to the arrangement of the optical fiber insertion holes 12 in an orthogonal direction to the direction of arrangement of the optical fiber insertion holes 12. Moreover, the two fitting holes 13 are disposed point-symmetrically with respect to distribution center P of the entire optical fiber insertion holes 12 in the two-dimensional arrangement.

In FIG. 9, the distribution center P is located in the center of the two rows of the optical fiber insertion holes 12 and in the center in the longitudinal direction of the two rows.

The ferrule body 11A can also achieve similar effect to the case of the single lateral row (i.e. the one dimensional arrangement) of the optical fiber insertion holes in the ferrule body 11 (see FIG. 2) of the first embodiment.

Meanwhile, it is also possible to provide the optical connector 21 (see FIG. 3) of the second embodiment with the optical fiber insertion holes in the two-dimensional arrangement instead of those in the one-dimensional arrangement including the single lateral row.

Sixth Embodiment

A sixth embodiment of the present invention will now be described.

Figure 10:
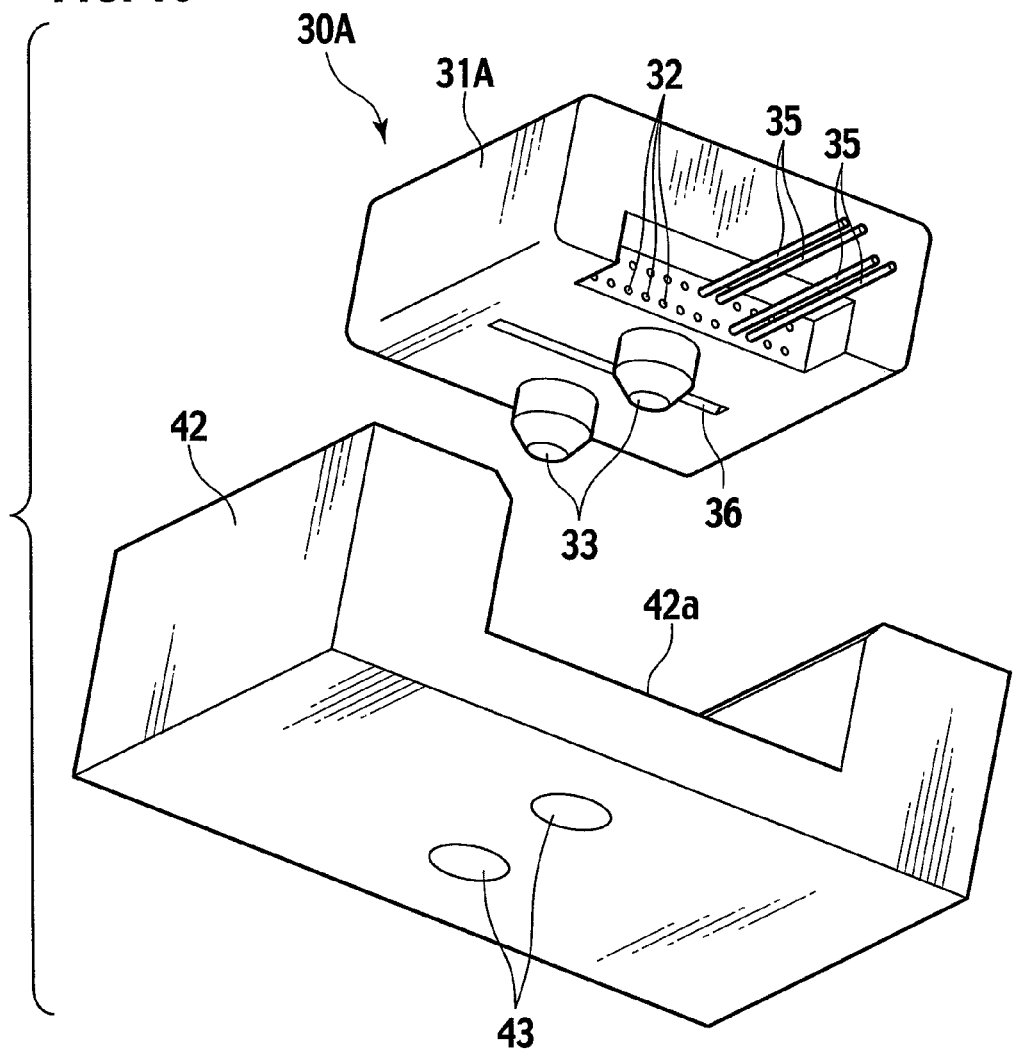
FIG. 10 is a perspective view showing an example of an optical connector and a positioning table for mounting the optical connector according to a sixth embodiment of the present invention.

As shown in FIG. 10, a ferrule body 31A of an optical path change type of this embodiment includes multiple optical fibers 35 arranged in two rows in a perpendicular direction to a fitting surface 31a. That is, the sixth embodiment represents the optical connector of the optical path change type obtained by changing the one-dimensional optical path row arranged in the ferrule body 31 (see FIG. 4) of the third embodiment into the two-dimensional arrangement.

Figure 11:
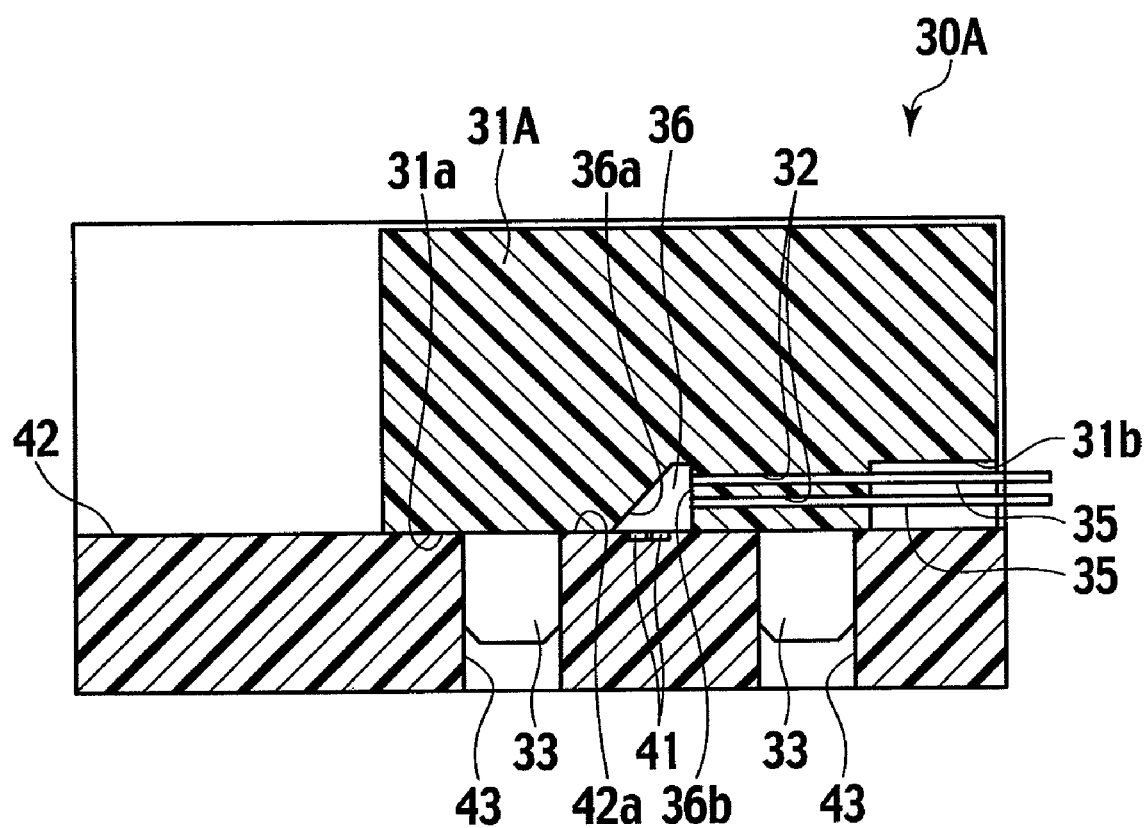
FIG. 11 is a lateral sectional view showing a state of mounting the optical connector in FIG. 10 on the positioning table.

Two fitting pins (or fitting holes) 33 for positioning are provided so as to be located on mutually opposite sides relative to optical path rows in a orthogonal direction (in the lateral direction in FIG. 11) to a direction of arrangement (the vertical direction of FIG. 11) of the optical path rows. Moreover, the two fitting pins 33 are located point-symmetrically with respect to distribution center of the entire optical path rows that are two-dimensionally arranged.

The ferrule body 31A of this embodiment can also achieve similar effect to the case of the single lateral row (i.e. the one-dimensional arrangement) of the optical path row as in the ferrule body 31 (see FIG. 6) of the third embodiment. Meanwhile, it is also possible to provide the ferrule body 51 (see FIG. 8) of the third embodiment with the optical fiber insertion holes 32 in the two-dimensional arrangement instead of those in the one-dimensional arrangement including the single lateral row.

The embodiments stated in terms of the optical connectors of the optical path change type showed the case where the optical fiber insertion holes 32 are disposed parallel to the connection surface 31a (the fitting surface 42a). However, an angle defined by the direction of extension of the optical fiber insertion holes 32 and the connection surface 31a may be set as appropriate. For example, it is also possible to incline the direction of the optical fiber insertion holes 32 shown in FIG. 5 in a direction from the upper right to the lower left of FIG. 5. In this case, it is possible to optically couple the optical elements 41 with the optical fibers 35 if the reflection surface (the mirror surface) can ensure a critical angle. Alternatively, it is also possible to change the angle of the reflection surface appropriately in conformity with the inclination of the optical fiber insertion holes 32 in order to couple the optical elements 41 with the optical fibers 35 optically.

In the case of the optical connector of the optical path change type, it is also possible to employ, instead of forming the optical fiber insertion holes, a method of forming multiple V grooves having V-shaped cross sections on the bottom surface of the optical connector, then placing the optical fibers inside these V grooves, and pushing the optical fibers with a lid made of transparent glass or the like.

In the present invention, the fitting pin represents an embodiment of the positioning protrusion while the fitting hole represents an embodiment of the positioning recess for receiving the positioning protrusions.

In general, in a male optical connector of an MT optical connector which is integrally formed of resin, fitting pins made of metal such as SUS are inserted into fitting holes formed on a ferrule body. In the present invention, the fitting pins made of resin may be integrally formed on the ferrule body.

Meanwhile, in a general MT optical connector, the fitting pin is formed into a circular cross-sectional shape provided with a conical tip end. However, the shape of the fitting pins of the present invention is not limited to this configuration. That is, the positioning protrusions and the positioning recesses are not limited only to the fitting pins and the fitting holes but represent general terms for encompassing various other structures having positioning functions.

Moreover, in the embodiments of the present invention, the inclined surface formed on the ferrule body is used as the reflection surface for reflecting the light. However, the reflection surface is the general term encompassing a portion having a function to reflect the light and is not therefore limited only to the above-described embodiments. For example, it is possible to form an end surface of an optical fiber into an inclined surface and to form a reflection film on the inclined surface as appropriate. In this case, it is not necessary to provide the optical connector with the structure corresponding to the inclined surface. Note that techniques for forming the end surface of the optical fiber into the inclined surface to reflect the light propagated through the optical fiber are publicly known and specific explanations will therefore be omitted.

In addition, the term optical fiber used in the present invention means an optical waveguide. Such optical waveguides include optical fibers that are entirely made of quartz, polymer optical fibers (plastic optical fibers) made of PMMA, polystyrene, polyimide and the like, and optical fibers formed by arranging the above-mentioned optical fibers in parallel, for example.

What is claimed is:

1. An optical connector comprising
a ferrule body including:
 a connection end surface;
 at least one row of optical fiber insertion holes provided on the connection end surface; and positioning protrusions or positioning recesses provided on the connection end surface, wherein the row of the optical fiber insertion holes extends parallel to a straight line passing through a center of the connection end surface, the positioning protrusions or the positioning recesses are respectively located on mutually opposite sides of the straight line, and the positioning protrusions or the positioning recesses are located point-symmetrically with respect to the center on the straight line.

2. An optical connector comprising
a ferrule body including:
   a connection end surface;
   positioning protrusions or positioning recesses provided on the connection end surface; and
   a reflector configured to modify a direction of light propagating through at least one row of fixed optical fibers so as to cause the light to pass through the connector end surface, wherein the positioning protrusions or the positioning recesses are respectively located on mutually opposite sides of a straight line which is parallel to a row of optical paths of the light on the connection end surface and which passes through a center thereof, and the positioning protrusions or the positioning recesses are located point-symmetrically with respect to the center.

3. The optical connector according to claim 2,
wherein the ferrule body includes an inclined surface serving as the reflector, and
the inclined surface is inclined relative to optical axes of the optical fibers.

4. The optical connector according to claim 3,
wherein the ferrule body includes a recess on the connection end surface, and
the inclined surface is included in surfaces defining the recess.

5. The optical connector according to claim 3,
wherein the inclined surface is provided as an outer side surface of the ferrule body, and
the inclined surface reflects the light inside the ferrule body.

6. The optical connector according to claim 2,
wherein the positioning protrusions or the positioning recesses are located on a straight line perpendicular to the straight line.

7. The optical connector according to claim 1,
wherein the positioning protrusions are pins of a round bar shape, and
the positioning recesses are holes into which the pins are to be fitted.

8. The optical connector according to claim 7,
wherein the pins are formed of resin integrally with the ferrule body.

9. The optical connector according to claim 2,
wherein the positioning protrusions are pins of a round bar shape, and
the positioning recesses are holes into which the pins are to be fitted.

10. The optical connector according to claim 9,
wherein the pins are formed of resin integrally with the ferrule body.

* * * * *